Figure 1:
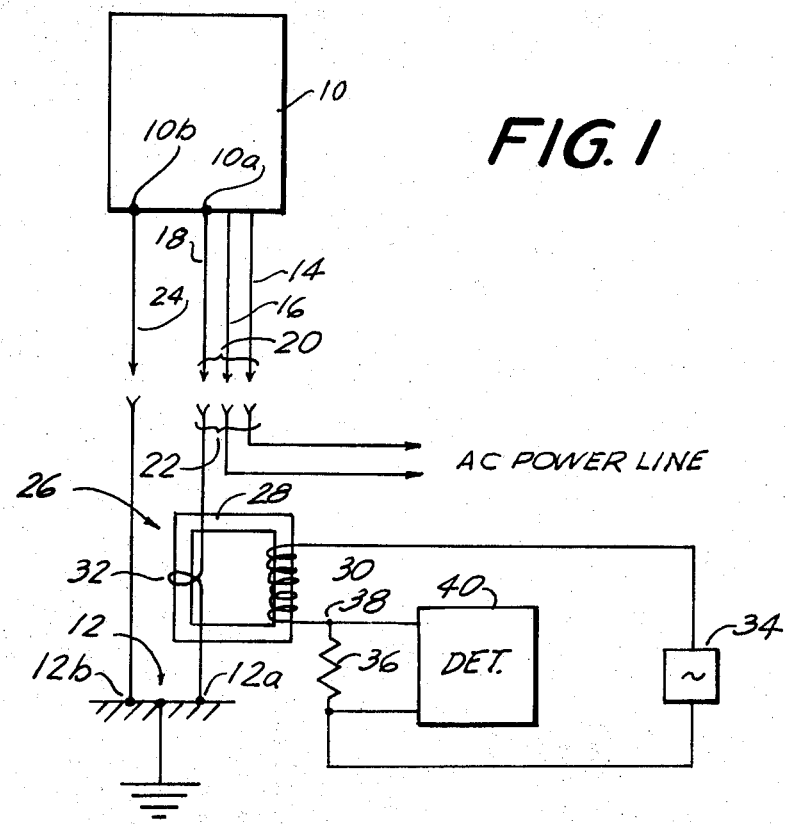

United States Patent [19]
MacPhee

[11] 3,774,106

[45] Nov. 20, 1973

[54] ELECTRICAL GROUNDING SYSTEM AND GROUND INTEGRITY CHECKER

[75] Inventor: Colin A. A. MacPhee, West Hill, Ontario, Canada

[73] Assignee: Federal Pacific Electric Company, Newark, N.J.

[22] Filed: Sept. 15, 1971

[21] Appl. No.: 180,576

[52] U.S. Cl. .................................. 324/51, 317/18 B
[51] Int. Cl. ............................................. G01r 31/02
[58] Field of Search ..................... 340/255; 324/51, 324/52, 54, 158 D, 127; 340/255, 256; 317/18 R, 18 B, 18 C

[56] References Cited
UNITED STATES PATENTS

| | | | |
|---|---|---|---|
| 2,895,104 | 7/1959 | Hansen et al. | 324/51 |
| 3,086,170 | 4/1963 | Kemelhor et al. | 324/51 X |
| 3,141,128 | 7/1964 | Behr | 324/51 |
| 3,368,146 | 2/1968 | Regan et al. | 324/51 |
| 3,648,163 | 3/1972 | Pinner et al. | 324/51 |
| 3,676,739 | 7/1972 | Neuhouser | 117/18 C |
| 2,929,963 | 3/1960 | Kaestle | 317/18 A |
| 3,135,911 | 6/1964 | Van Allen | 324/127 X |
| 3,136,948 | 6/1964 | Windsor | 324/127 |
| 1,743,318 | 10/1930 | Carrington | 324/52 |
| 2,788,486 | 4/1957 | Guggi | 324/51 |
| 2,800,630 | 7/1957 | Kowalczyk | 324/127 |
| 2,935,676 | 5/1960 | Keltz | 324/158 D UX |

*Primary Examiner*—Gerard R. Strecker
*Attorney*—Paul S. Martin

[57] ABSTRACT

An electrical grounding system for equipment (such as electrical instruments in an intensive-care hospital room) includes two ground conductors, both connected to a common ground and to the equipment to be grounded and forming a loop. In case of a break in one conductor between the equipment and ground, the other conductor maintains the equipment ground. A ground-integrity checking transformer has a secondary winding of few turns interposed as a series element in the grounding loop and injects only a minimal test voltage in the loop. A primary winding of many turns is used for impressing excitation; and the primary winding is in a test circuit that evidences a break in the grounding loop.

10 Claims, 2 Drawing Figures

PATENTED NOV 20 1973 3,774,106

ELECTRICAL GROUNDING SYSTEM AND GROUND INTEGRITY CHECKER

The present invention relates to systems for providing an electrical ground for equipment to be grounded, and to devices for checking the integrity of such a ground.

The illustrative embodiment of the invention is a grounding and ground-checking system primarily intended for use in hospitals, especially as part of an intensive care unit. For that reason the specification is addressed to that application of the invention. However, it will be recognized that the invention has other comparable applications.

Electrical and certain other equipment used in the vicinity of a patient in an intensive-care unit of a hospital is required to be grounded for safety. The ground circuit should limit the rise of potential of the equipment above ground to a low value, considering the especially low electrical resistance of the patient in some situations and the low levels of current that could cause death. A catheter could be inserted deep in the patient, and the appearance of an electrical potential on the catheter exceeding five millivolts for example could prove fatal.

Various grounding and ground-checking systems have been proposed, but these have serious deficiencies. In addition to the usual ground wire for the equipment, there is a ground-checking wire. The ground wire and the ground checking wire are connected to the equipment, and a test potential is impressed between those wires remote from the equipment. Any break in the ground wire is evidenced by the interruption of the test current. Such circuits commonly require the ground-checking wire to be connected to a test signal source at a potential substantially above ground, or the impedance of the test signal impressing circuit may be high. Consequently, in case the ground wire should develop a break, the potential of the theretofore grounded equipment may become high due to the potential of the test signal source or due to the impedance of the ground integrity tester that is interposed between the ground checking wire and ground.

Pursuant to the present invention, a grounding wire and a ground-checking wire are both connected to a common ground at one location and both are connected to electrical equipment so as to form a low-impedance loop. A transformer is provided having a secondary winding of only a few turns interposed in said loop as a series element. The loop represents a low-impedance load or burden on the transformer, and in case of a break in the ground wire or in the ground-checking wire, this burden on the transformer disappears. Another winding that is the primary excitation winding in the illustrative embodiment of the invention described in detail below, has many more turns than the secondary winding, and the primary winding is used for detecting any change in transformer loading that reults from a break in the loop. An excitation source is connected to the transformer primary and a series impedance. A break in the grounding loop connected to the transformer secondary results in a prominent shift in the distribution of the excitation potential that divides across the transformer primary and the series impedance. This shift in potential is used for sounding an alarm or for providing any other suitable indication of a break in the grounding loop.

Notably the grounding wire and the ground-checking wire are both at very low potential with reference to ground, when the loop is intact as well as after a break occurs in the loop. Consequently, even if a break in the grounding loop should occur, there is no danger of the equipment which should remain soundly grounded being raised above ground by a hazardous potential originating in the ground-integrity checking circuit. As a further feature, because the ground-checking wire and the grounding wire both have low-impedance connections to ground and both are connected to the equipment to be grounded, it follows that a break in either wire does not interfere with the other wire serving as a low-impedance ground connection for the equipment.

The nature of the invention including the foregoing and other objects, advantages and novel features will be best appreciated from the detailed description that follows, of an illustrative embodiment of the invention and a modification shown in the accompanying drawings.

Figure 2:
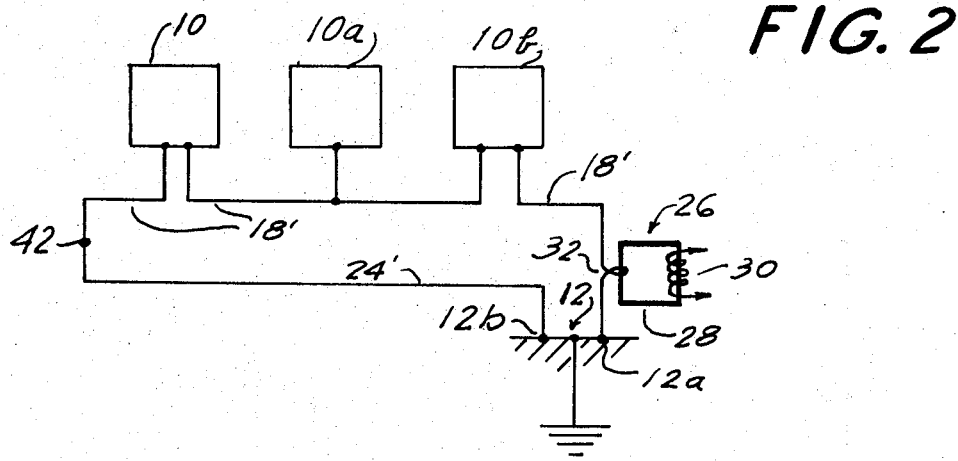

In the drawings:

FIG. 1 is a wiring diagram of an equipment grounding and ground-checking system, being a presently preferred illustrative embodiment of the invention, and FIG. 2 is a wiring diagram of a modification of part of the system of FIG. 1.

In FIG. 1, equipment 10 represents a piece of diagnostic equipment used in an intensive-care unit of a hospital. "Patient-ground" 12 is a common grounding point to which all metal structures and equipment in the vicinity of the patient are to be grounded. Electrical power for operating equipment 10 is supplied from an AC power line via two wires 14 and 16 of a three-wire power cable. The third wire 18 of the cable is a conventional grounding wire. The three-wire cable is connected by a male plug 20 and a mating receptacle 22 to a panel (not shown) installed at the location of the "patient-ground" 12. Ground wire 18 has connections 10a at the equipment chassis and 12a at the patient ground.

As a safety feature, it is important to maintain a check on the integrity of the ground wire 18 and its connections to equipment 10 and patient ground 12. This is done by a checking system that includes a second wire 24, serving its usual purpose as a checking wire and here serving additionally as a second equipment grounding wire that has its separate connections 10b and 12b to the equipment chassis and to patient ground 12.

A transformer 26 includes a rectangular core 28, a primary winding 30 and a secondary winding 32. Winding 32 is interposed in ground conductor 18 as a series element but it is of low impedance since it has only a few turns. A loop can be traced from patient ground 12, connection 12a, secondary winding 32, ground wire 18, connection 10a, the metal structure of equipment 10, connection 10b, checking wire 24 and connection 12b to patient ground. Assurance is had that wires 18 and 24 are actually connected to equipment 10 and to patient ground 12 (rather than being merely connected to each other) by providing the separate connections 10a and 10b, and 12a and 12b.

Transformer 26 has a large step-down ratio. In an example, secondary winding has three turns, and primary winding has 1,500 turns. With eight volts AC (for example measured peak-to-peak) applied to primary winding 30, secondary 32 produces an output of only 16 M.V. peak-to-peak or about 5 millivolts R.M.S. This is the greatest value of test voltage that would exist at equipment 10, and would occur only in case of a break in the ground-check wire 24. If ground wire 18 or its connections were to develop a break, then there would be no test voltage at equipment 10. This neglects the voltage drop in the grounding connections resulting from leakage current from equipment 10 to ground. When the ground path from equipment 10 to patient ground 12 via ground conductor 18 is intact, a low impedance path to ground is provided for ground leakage current from the equipment 10. Secondary winding 32 consisting of very few turns and being made of large-gage wire, has extremely low-impedance and does not contribute appreciably to the total impedance of grounding conductor 18.

A ground-integrity test signal is impressed on the loop including conductors 18 and 24 by secondary winding 32. The test signal comes from alternating-current source 34 which is of any suitable frequency, advantageously a much higher frequency than the 60 Hz. of the AC power line, e.g. 1,000 Hz. The output of source 34 is impressed on resistor 36 and primary winding 30 connected in series at junction 38.

So long as the ground-loop circuit remains intact, it represents a heavy load on transformer secondary 32. This effect considerably reduces the counter-e.m.f. in primary winding 30 compared to that which would develop in the primary winding with its secondary winding not loaded. Consequently, when the ground loop including wires 18 and 24 is intact, a relatively large part of the total voltage impressed by source 34 on resistor 38 and primary 30 appears across the resistor. In case the ground-loop should open, the voltage across resistor 36 drops. Detector 40 connected across resistor 36 responds to such a change, in case of a break in the ground-loop test circuit. This is an effective and economical way of checking for the change in loading on transformer 30 that results from a break in the grounding loop 18,24 etc. Detector 40 may otherwise be connected across primary 30 for detecting a like change; and in that event resistor 36 would amount to a high source impedance. The form of circuit shown is preferred, however, because it is more nearly fail-safe.

Winding 30 serves in dual capacities, for applying the test voltage and for deriving the response to the change in loading that occurs when a break develops in the grounding loop. A separate secondary winding might be added to the transformer for deriving a response to the change in loading, and while that approach is within the broad spect of the invention, the added winding is not needed.

The ground-checking system of FIG. 1 involves two low-impedance connections between equipment 10 and ground 12. This is an attractive feature because one ground connection remains in effect even if a break should occur in the other. This contrasts with other arrangements for checking the inegrity of the equipment ground connection, where the detector circuit connected to the ground-check wire ordinarily has a high impedance path to ground and may also apply a somewhat hazardous test voltage to the equipment that is to be grounded when the conductor providing a grounding path is broken.

The circuit of FIG. 1 involves grounding of a single piece of equipment, and that is recommended. The same detection system and dual grounding loop could be extended to include multiple equipments as shown in FIG. 2. Grounding wire 18' is connected to ground check wire 24 at a junction 42 remote from connections 12a and 12b at the patient ground 12. Additional to equipment 10, it is possible to provide single-wire grounding connection between wire 18 and to one or more equipments 10b, and it is also possible to provide two-wire connections between each of one or more equipments 10c and grounding conductor 18'. These departures from the system of FIG. 1 introduce increments of resistance, notably contact resistance, in the grounding current path. Ground leakage current from the equipments to be grounded in such a system tends to multiply, and the resistance drops due to such leakage also tend to multiply. All of these factors tend to reduce the effectiveness of the system and are not preferred. The system of FIG. 2 represents another application of the invention. The test signal source and the detection circuit of the system of FIG. 2 is not shown, since it is the same as in FIG. 1.

The circuit of FIG. 2 includes equipment 10b connected to the grounding loop at only one point. It is possible for this connection to be faulty and yet the closed-loop grounding and ground checking circuit would be intact. For full benefit of the checking system it is desirable for the equipment to have two connections to the grounding loop in such a way that the equipment is a series element in the closed-loop grounding system. This was described in connection with FIG. 1, and it is shown in FIG. 2 with respect to equipments 10 and 10c.

Modifications and varied applications of the novel concepts in the foregoing illustrative embodiments of the invention. Therefore, the appended claims should be construed broadly in accordance with the full spirit and scope of the invention.

I claim:

1. A system for providing an electrical equipment ground and for continuously checking the integrity of the electrical grounding circuit including first and second grounding conductors, both of said conductors being connected to ground at a common location and both being connected to equipment to be grounded at a distance from the connection of said conductors to ground, whereby the equipment is continuously grounded by each conductor despite a possible break in the other, said system further including a transformer having a primary winding and a low-impedance secondary winding of at least one turn interposed as a series element in said first conductor and adapted to provide an output of substantially less than one volt, said first and second ground conductors and said secondary winding and said connections thereof to ground and to the equipment forming a closed-loop circuit that constitutes a burden on said transformer, and means coupled to said transformer but external to said closed-loop circuit and responsive to a change in the burden on the transformer for indicating an increase in impedance in said closed-loop circuit.

2. A grounding and ground-integrity checking system in accordance with claim 1, wherein said means for indicating a break in said closed-loop circuit includes an impedance connected in series with said primary winding, an excitation signal source connected across said series-connected primary winding and impedance, and a detector responsive to a change in the distribution of the excitation signal voltage across said impedance and said primary winding, said detector forming said means for indicating a break in said closed-loop circuit.

3. A grounding and ground-integrity checking system in accordance with claim 2, wherein said detector is connected across said impedance and is subjected to higher signal excitation when said closed-loop circuit is intact than when it is open, said detector thereby providing a warning signal in response to a break in said closed-loop circuit and any other cause of decrease in signal level below that which represents an intact closed-loop circuit.

4. A grounding and ground-integrity checking system in accordance with claim 1, wherein said means for indicating a break in said closed-loop circuit includes means for impressing a test voltage on said transformer primary winding, said impressing means including a test signal source having impedance means for causing the test signal impressed on the primary winding to remain relatively low so long as the closed-loop circuit is intact, and to rise in response to a break.

5. A grounding and ground-integrity testing system in accordance with claim 4, wherein said secondary winding has a few turns and said transformer has a very large step-down ratio so that volts impressed on the primary winding can only produce a relatively small number of millivolts across the secondary.

6. A grounding and ground integrity checking system in accordance with claim 1, wherein the equipment has two connections to the closed-loop circuit and is itself interposed as a series element in the closed-loop circuit, whereby interruption of either connection of the equipment to the closed-loop circuit produces an indication of a break, thus providing assurance not only that the closed-loop circuit is intact, but also that the equipment is grounded.

7. The method of checking the integrity of a grounding circuit for patient-care electrical equipment which includes a grounding current path extending from patient-care electrical equipment to an electrical ground and a checking current path from said equipment to the electrical ground, said current paths constituting a closed-loop circuit, including the steps of injecting a monitoring signal of substantially less than one volt into said closed-loop circuit and detecting an increase in impedance of said closed-loop circuit as an electrical change in the effect of said closed-loop circuit on the signal-injecting means.

8. The method of checking the integrity of a grounding circuit of patient-care electrical equipment in accordance with claim 7, wherein said step of injecting a monitoring signal includes the step of using a transformer having a secondary interposed in said closed-loop circuit and a signal source connected to the transformer, and wherein the step of detecting an electrical change in the signal injecting means caused by an increase of impedance of said closed-loop circuit includes utilizing detection means connected to the transformer external of said closed-loop circuit.

9. The method of checking the integrity of a grounding circuit of patient-care electrical equipment in accordance with claim 8, wherein the detecting step includes utilizing a detector coupled to the transformer so as to have normal monitoring-signal detector input when the signal source is operative and when the closed-loop circuit is intact, where the input to the detector changes both upon an increase in impedance of said closed-loop circuit and upon a decrease in test signal input to the transformer.

10. The method of checking the integrity of a grounding circuit of patient-care electrical equipment in accordance with claim 9, wherein said detector includes a series impedance and a primary winding of the transformer connected in series to the signal source, the detection step including detecting a drop in signal across the series impedance to signify either or both of two conditions, one condition being an increase in impedance of the loop circuit and the other condition being a reduction of the test signal output.

* * * * *